(12) United States Patent
Sjoberg

(10) Patent No.: US 8,785,183 B2
(45) Date of Patent: Jul. 22, 2014

(54) ACTIVE PLASTIC MATERIAL IN OIL

(75) Inventor: Elisabeth Sjoberg, Lund (SE)

(73) Assignee: Biogaia AB, Stockholm (SE)

( * ) Notice: Subject to any disclaimer, the term of this patent is extended or adjusted under 35 U.S.C. 154(b) by 103 days.

(21) Appl. No.: 13/200,126

(22) Filed: Sep. 19, 2011

(65) Prior Publication Data

US 2012/0070880 A1 Mar. 22, 2012

Related U.S. Application Data

(60) Provisional application No. 61/403,765, filed on Sep. 21, 2010.

(51) Int. Cl.
*C12M 1/24* (2006.01)

(52) U.S. Cl.
USPC ............................................ 435/307.1; 435/4

(58) Field of Classification Search
USPC .................................................. 435/4, 307.1
See application file for complete search history.

(56) References Cited

U.S. PATENT DOCUMENTS

| | | | |
|---|---|---|---|
| 4,518,696 A | 5/1985 | Gehrman et al. | |
| 6,174,952 B1 | 1/2001 | Hekal et al. | |
| 7,461,519 B2 * | 12/2008 | Fralick et al. | 62/503 |
| 8,003,179 B2 * | 8/2011 | Merical et al. | 428/35.9 |
| 2003/0235664 A1 | 12/2003 | Merical et al. | |
| 2005/0271641 A1 | 12/2005 | Bjorksten et al. | |
| 2006/0147662 A1 * | 7/2006 | Rayner-Brandes et al. | 428/35.2 |

FOREIGN PATENT DOCUMENTS

| | | |
|---|---|---|
| EP | 1 187 874 B1 | 5/2009 |
| EP | 1 121 190 B1 | 12/2009 |
| WO | WO 01/98174 A1 | 12/2001 |

* cited by examiner

*Primary Examiner* — Ruth Davis
(74) *Attorney, Agent, or Firm* — Lynn E. Barber

(57) ABSTRACT

A method is provided of prolonging the shelf life of probiotic lactic-acid producing bacteria formulated in oil, by using a specific moisture absorbing technology.

3 Claims, 2 Drawing Sheets

US 8,785,183 B2

ACTIVE PLASTIC MATERIAL IN OIL

CROSS-REFERENCE TO RELATED APPLICATIONS

This application claims priority from U.S. Provisional Patent Application Ser. No. 61/403,765 filed Sep. 21, 2010.

FIELD OF THE INVENTION

The present invention relates generally to the packaging of products that are sensitive to moisture and oxidation, consequently prolonging the shelf-life of such a product. More specifically this invention relates to a method of prolonging the shelf life of probiotic lactic-acid producing bacteria formulated with oil, by using a specific moisture absorbing and oxygen scavenging technology.

BACKGROUND OF THE INVENTION

According to the currently adopted definition by FAO/WHO, probiotics are: "live microorganisms which when administered in adequate amounts confer a health benefit on the host". Nowadays, a number of different bacteria are used as probiotics, for example, lactic-acid producing bacteria such as strains of *Lactobacillus* and *Bifidobacteria*. Lactic-acid producing bacteria are not only used for their beneficial effect on human or animal health they are also widely used in the food industry for fermentation processes. Often, the microorganisms marketed for these purposes are formulated as freeze-dried powders in a low water content environment.

A general problem encountered in the application of such freeze-dried microorganism preparations is the limited storage stability of the cells since the available free water content is deleterious for the cells. Over time the microorganisms become less viable resulting in high dosages necessity to compensate for this loss of activity, if there are sufficient viable organisms to make this possible.

For the purpose of storage, it is generally known to utilize foil having a plastic layer on one surface on the outside of the compartment, such as a polyethylene laminated aluminum foil as packaging material to reduce exposure of the freeze-dried lactic acid bacteria to moisture and oxygen. But even when barrier materials are effective at restricting the transmission of water molecules through a package, certain features of the package may still allow for the transmission of water molecules, for example, along the edges of a heat-sealed package. Also the process of filling the package in itself may contribute to trapping water inside the packaging.

One solution to maintain a particularly low level of moisture within a package is to incorporate sachets of desiccant material into the internal space of the package to remove the moisture from the headspace of the package. The desiccant material is generally known to reduce the moisture content within a package. Typical desiccant materials are "physical" desiccant materials, such as molecular sieves that bind water molecules within pore spaces of a material. Another type of desiccant material includes hydrate forming agents such as salts, such as ammonium chloride. Desiccant materials may also be used that form no hydrates, such as common salt (NaCl) or potassium bromide (KBr).

Another way to protect freeze-dried lactic acid bacteria cultures is to use an oil-based formulation. Lactic acid bacteria cells have been used in oil-formulations for improved stability of the bacteria, see for example U.S. Pat. No. 4,518,696 by Gehrman et al. The inventors of US patent application publication No. 20050271641 went a step further by adding the step of vacuum-drying the oil before formulation for increased stability of the bacteria cultures and a product called "*Reuteri* Drops" was manufactured. The product is an oil-based formulation containing *L. reuteri* made for good stability and shelf life. The unique feature of this production process is a drying step of the oil to remove most of the water. The oil used in US patent application publication No. 20050271641 is a pure edible vegetable oil, preferably sunflower oil. Although oil such as pure sunflower oil would not be expected to contain much water, an unexpected effect of the processing step of drying the oil by placing it under vacuum is a significantly increased stability of the lactobacilli in the formulation.

However there is from time to time still a problem with stability of lactic acid bacteria formulated in oil, which may or may not have been processed by vacuum, as it may not be possible to remove all moisture by vacuum and/or new moisture may enter the oil formulation during packaging or storage in different containers.

The invention described herein fortunately provides an improved and more efficient method for the storage of freeze-dried lactic acid bacteria by combining oil-based formulations containing lactic acid bacteria, for example described in US patent application publication No. 20050271641, and moisture absorbing polymeric material described in patent application EP 1187874, patent EP 1121190 and U.S. Pat. No. 6,174,952 or a multilayer plastic polymeric flexible packaging foil having a chemical desiccant material incorporated within a layer of foil as described in U.S. Pat. No. 8,003,179.

The description of the polymeric material in the above-mentioned patent documents includes processes and resulting structures for producing a modified polymer having interconnecting channels. The interconnecting channels act as controlled transmission passages through the polymer. A hydrophilic agent is blended into the polymer so that it is distributed within the polymer. A water-absorbing material is blended into the polymer so that the water-absorbing material is distributed within the product. The product is solidified so that the hydrophilic agent forms passages in the product through which a desired composition is communicable to the water-absorbing material that is entrained within the product. The solidified product described in above-mentioned patent documents may be used to form a desired shaped article such as plug type inserts and liners for closed containers, or it may be formed into a film, sheet, bead or pellet. One example of such a product is M-0026 Activ-Strip™, (CSP Technologies, Auburn, USA), which is a moisture absorbing film with molecular sieve.

However unlike the invention herein none of the prior-art, including the patent documents mentioned above, mention the absorption of moisture from a non-water liquid, including oil using a specific moisture absorbing material, such as especially prepared polymer strips or foils having an incorporated chemical desiccant material. On the contrary, it is clear from for example EP1187874 that this technology is intended for passage of a gas through the polymer.

Thus, it was previously known that the stability of probiotic lactic-acid producing cultures is closely correlated with water activity of the formulation, it was also known to dry oil under vacuum for the stabilization of *lactobacilli*. It was a surprise when the inventor of the invention herein showed that using specific desiccant material incorporated into a specific polymeric structure together with oil-formulated *L. reuteri* considerably improved the stability of such cultures.

SUMMARY OF THE INVENTION

The present invention relates to the packaging of products that are sensitive to moisture and oxidation, consequently prolonging the shelf-life of such a product.

A primary object of the present invention is to provide an improved method for the storage of freeze-dried lactic acid bacteria formulated in oil.

An object of the present invention is to use specific moisture absorbing material, such as especially prepared polymer strips or a foil having an incorporated chemical desiccant material in a packaging for the storage of freeze-dried lactic acid bacteria formulated with oil.

Another object is to use a container internally coated with specific moisture absorbing material for the storage of freeze-dried lactic acid bacteria formulated with oil.

Other objects and advantages of the present invention will become obvious to the reader and it is intended that these objects and advantages are within the scope of the present invention.

DETAILED DESCRIPTION OF THE INVENTION AND PREFERRED EMBODIMENTS THEREOF

Figure 1:
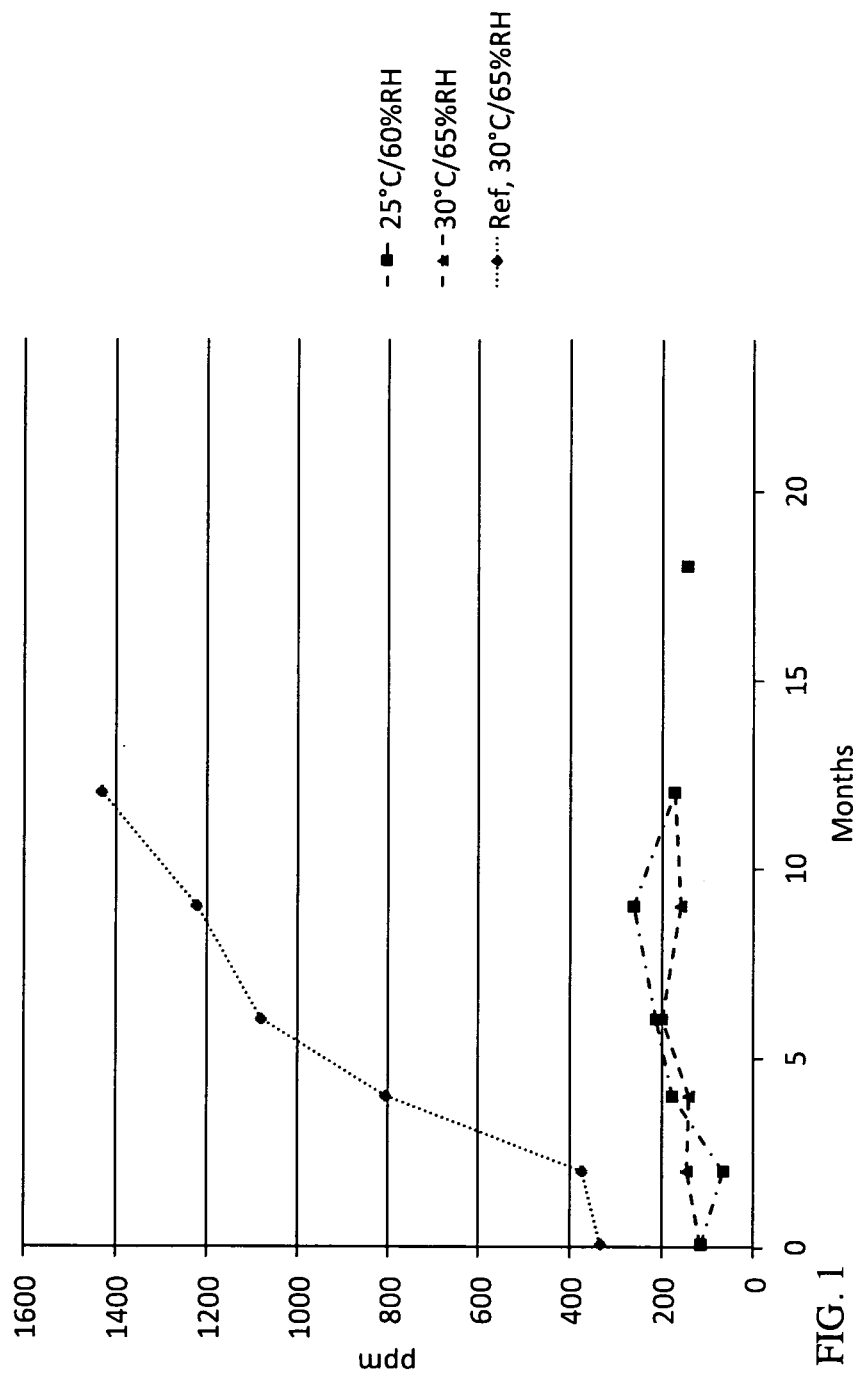
FIG. 1 shows the result of a stability study with the invention herein. Showing the water content in a product with *Lactobacillus reuteri* formulated in oil, with the desiccant film M-0026 Active-Strip™. The reference product does not contain any desiccant film.
Figure 2:
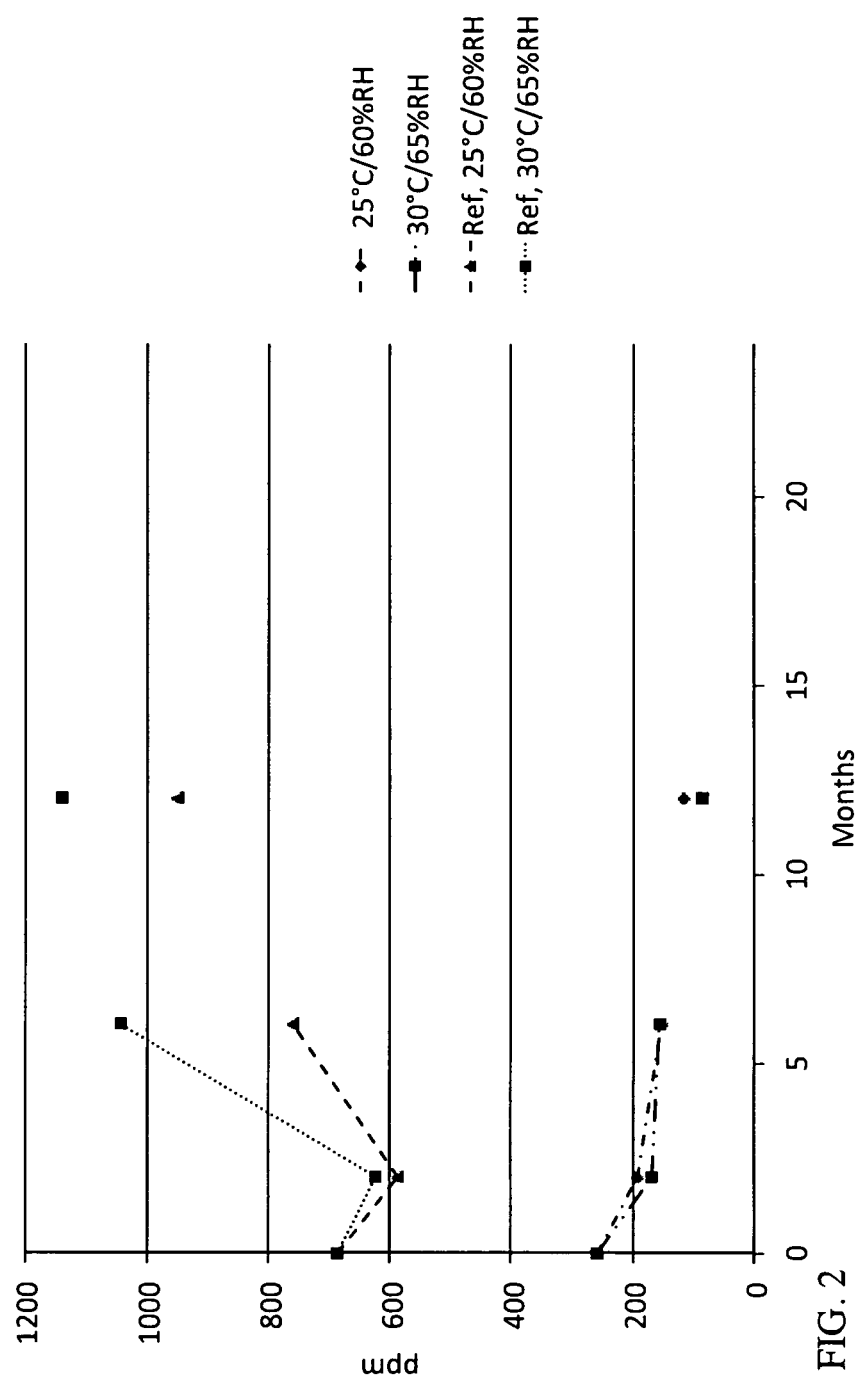
FIG. 2 is a figure showing the result of another stability study, as in FIG. 1.

The general object of the present invention is to use specific moisture absorbing material, such as especially prepared polymer strips or foils having an incorporated chemical desiccant material in a packaging for the storage of freeze-dried lactic acid bacteria formulated with oil. The moisture absorbing material should be used in the packaging in such way that it is only in direct contact with the oil containing the freeze-dried lactic acid bacteria and thereby can absorb the possible water from the oil.

The specific moisture absorbing material can also be used to internally coat a container used for the storage of freeze-dried lactic acid bacteria formulated with oil.

One embodiment the invention is a method of prolonging the shelf life of products sensitive to moisture and oxidation, such as *Lactobacillus reuteri* formulated in oil, by using a specific desiccant film (M-0026 Activ-Strip™, CSP Technologies, Auburn, USA) or a film with a desiccant material incorporated (as described in U.S. Pat. No. 8,003,179).

Another embodiment the invention is a method of prolonging the shelf-life of products sensitive to moisture and oxidation, such as *L. reuteri* formulated in vacuum-dried oil, by using a specific desiccant film (M-0026 Activ-Strip™, CSP Technologies, Auburn, USA) or a film with a desiccant material incorporated (as described in U.S. Pat. No. 8,003,179).

A stability study was performed to investigate how a moisture absorbing film (M-0026 Activ-Strip™, CSP Technologies, Auburn, USA) provided by CSP Technologies influences viability of *L. reuteri* formulated with oil. The test method used in the stability study for water determination is ASTM D6304-07, which is a standard test method for determination of water in petroleum products, lubricating oils, and additives by colometric karl fischer titration.

Example 1

Manufacture of a Freeze-Dried Product Containing *L. reuteri* Formulated in Oil

Mixing of Ingredients.
1. Mix the medium-chain triglyceride (for example, Akomed R, (Karlshamns A B, Karlshamn Sweden)) and sunflower oil (for example, Akosun, Karlshamns) with silicon dioxide, (Cab-o-sil M5P, M5P, Cabot) in a Bolz mixing machine/tank (Alfred BOLZ Apparatebau GmbH, Wangen im Allgu, Germany)
2. Homogenization. A Sine pump and dispax (Sine Pump, Arvada, Colo.) are connected to the Bolz mixer and the mixture is homogenized.
3. Adding *Lactobacillus reuteri*. About 20 kg of dried oil mixture is moved to a 50 liter stainless steel vessel. *L. reuteri* powder (preferably freeze-dried; the amount of *L. reuteri* used varies depending on the amount wanted in the oil. One example is to add 0.2 kg of culture having $10^{11}$ CFU per g). It is mixed slowly until homogenous.
4. Mixing. The premix with *L. reuteri* is brought back to the Bolz mixer.
5. Discharging. The suspension is discharged to a 200 liter vessel, and covered with nitrogen. The suspension is held in the vessel until filling in 5 ml glass bottles.
6. 20 mm of M-0026 Activ-Strip™, thickness 0.6 mm and width 15 mm, (CSP Technologies, Auburn, USA) is added in each bottle.

Example 2

Stability Study with Freeze Dried *L. reuteri* DSM 17938 Formulated in Oil with M-0026 Activ-Strips™

The bottles from example 1 were stored in climate cabinets at 25° C./60% RH and 30° C./65% RH respectively at BioGaia, Lund, Sweden.

The study was started on the 12 Dec. 2009. For results of the study, see FIG. 1.

What is claimed is:

1. A container comprising, a strip of desiccant polymer or a desiccant film, wherein the polymer or film is in direct contact with an oil and is capable of absorbing moisture from the oil, wherein the container is used for storage of products sensitive to moisture and oxidation that are suspended in an oil.

2. The container of claim 1, wherein the container includes a strip of desiccant polymer and the strip is 0.6 mm thick and 15 mm wide.

3. A container comprising an internal coating with a desiccant polymer or a desiccant film, wherein the polymer or film is in direct contact with an oil and is capable of absorbing moisture from the oil, wherein the container is used for storage of products sensitive to moisture and oxidation that are suspended in an oil.

* * * * *